(12) United States Patent  (10) Patent No.: US 8,720,233 B2
Font et al.  (45) Date of Patent: May 13, 2014

(54) SYSTEM FOR MAKING CHOPPED STRANDS

(75) Inventors: Dominique Font, Saint Baldoph (FR); Gerard Veuillen, Barberaz Chambery (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 1453 days.

(21) Appl. No.: 11/576,160

(22) PCT Filed: Sep. 12, 2005

(86) PCT No.: PCT/FR2005/050727
§ 371 (c)(1),
(2), (4) Date: Aug. 3, 2007

(87) PCT Pub. No.: WO2006/037908
PCT Pub. Date: Apr. 13, 2006

(65) Prior Publication Data
US 2008/0115537 A1  May 22, 2008

(30) Foreign Application Priority Data
Oct. 7, 2004  (FR) ...................................... 04 52285

(51) Int. Cl.
*C03B 37/03* (2006.01)
(52) U.S. Cl.
USPC ............................................................ 65/536
(58) Field of Classification Search
USPC ...................................................... 65/480, 536
See application file for complete search history.

(56) References Cited

U.S. PATENT DOCUMENTS

| | | | |
|---|---|---|---|
| 3,128,028 | A | 4/1964 | Crafford |
| 3,279,709 | A | 10/1966 | Carlson et al. |
| 3,293,013 | A | 12/1966 | Drummond |
| 3,644,109 | A | 2/1972 | Klink et al. |
| 3,681,039 | A | 8/1972 | Marzocchi |
| 3,744,361 | A | 7/1973 | Van Doorn |
| 3,771,701 | A | 11/1973 | Brunk et al. |

(Continued)

FOREIGN PATENT DOCUMENTS

| | | |
|---|---|---|
| CH | 284044 | 7/1952 |
| EP | 48658 | 3/1982 |

(Continued)

OTHER PUBLICATIONS

Notice of Allowance from U.S. Appl. No. 11/630,683 dated Jul. 20, 2012.

(Continued)

*Primary Examiner* — John Hoffmann
(74) *Attorney, Agent, or Firm* — Calfee, Halter & Griswold LLP

(57) ABSTRACT

An automatic restart procedure for a system for manufacturing chopped strands. At least one strand coming from a bushing is grabbed by a gripping device. The gripping device is moved right to a drawing device, the drawing device configured to bring the strand to a drawing speed compatible with a chopping operation carried out as the strand passes between an anvil wheel and a chopper wheel of a chopping machine. The path of the strand between the bushing and the drawing device is modified using a transfer device, the transfer device configured to pass the strand between the anvil wheel and the chopper wheel using an engagement device, or to be moved away from the chopper wheel and the anvil wheel.

20 Claims, 5 Drawing Sheets

(56) References Cited

U.S. PATENT DOCUMENTS

| | | | |
|---|---|---|---|
| 3,815,461 A | 6/1974 | Genson | |
| 3,841,184 A | 10/1974 | Thatcher | |
| 3,852,141 A | 12/1974 | Cross | |
| 3,873,290 A | 3/1975 | Marzocchi | |
| 3,915,681 A | 10/1975 | Ackley | |
| 4,033,741 A | 7/1977 | Drummond | |
| 4,175,939 A * | 11/1979 | Nakazawa et al. | 65/452 |
| 4,210,293 A | 7/1980 | Fromaget | |
| 4,222,758 A | 9/1980 | Stotler et al. | |
| 4,347,071 A * | 8/1982 | Willis et al. | 65/536 |
| 4,362,260 A | 12/1982 | Hasegawa et al. | |
| 4,367,084 A | 1/1983 | Cox et al. | |
| 4,369,681 A | 1/1983 | Van Doorn et al. | |
| 4,411,180 A * | 10/1983 | Roncato | 83/37 |
| 4,548,106 A | 10/1985 | Fleissner | |
| 4,551,160 A | 11/1985 | Frailey et al. | |
| 4,655,111 A | 4/1987 | Blaker et al. | |
| 4,682,523 A | 7/1987 | Johnson et al. | |
| 4,771,665 A | 9/1988 | Van Doorn et al. | |
| 5,092,207 A | 3/1992 | Kikuchi et al. | |
| 5,108,678 A | 4/1992 | Hirasaka et al. | |
| 5,398,575 A | 3/1995 | Rewitzer | |
| 5,935,289 A | 8/1999 | Arterburn et al. | |
| 5,970,837 A | 10/1999 | Arterburn et al. | |
| 6,062,048 A | 5/2000 | Arterburn et al. | |
| 6,076,442 A | 6/2000 | Arterburn et al. | |
| 6,148,640 A * | 11/2000 | Hendrickson et al. | 65/480 |
| 6,182,332 B1 | 2/2001 | Jander | |
| 6,202,525 B1 | 3/2001 | Hendrickson et al. | |
| 6,267,035 B1 | 7/2001 | Bascom et al. | |
| 6,415,997 B1 | 7/2002 | Font et al. | |
| 6,845,696 B2 | 1/2005 | Font et al. | |
| 2003/0000258 A1 | 1/2003 | Font et al. | |
| 2004/0172978 A1 | 9/2004 | Bumgarner et al. | |
| 2005/0066688 A1 | 3/2005 | Eis et al. | |
| 2009/0193852 A1 | 8/2009 | Boissonnat et al. | |
| 2010/0139326 A1 | 6/2010 | Karbowski | |
| 2011/0008482 A1 | 1/2011 | Font | |

FOREIGN PATENT DOCUMENTS

| | | |
|---|---|---|
| EP | 849381 | 6/1998 |
| EP | 978580 | 2/2000 |
| EP | 1910236 | 10/2011 |
| FR | 2075019 | 10/1971 |
| FR | 2126663 | 10/1972 |
| FR | 2162068 | 7/1973 |
| FR | 2204715 | 5/1974 |
| FR | 2490251 | 3/1982 |
| FR | 2804974 | 8/2001 |
| FR | 2876392 | 4/2006 |
| FR | 2916003 | 8/2009 |
| GB | 2 036 716 | 7/1980 |
| JP | 58-190834 | 11/1983 |
| WO | 98/01610 | 1/1998 |
| WO | 2006/008408 | 1/2006 |
| WO | 2006/037908 | 4/2006 |
| WO | 2007/010168 | 1/2007 |
| WO | 08/141123 | 11/2008 |

OTHER PUBLICATIONS

Office action from U.S. Appl. No. 10/312,849 dated Jun. 16, 2004.
Notice of Allowance from U.S. Appl. No. 10/312,849 dated Oct. 5, 2004.
Office action from U.S. Appl. No. 11/630,683 dated Aug. 6, 2010.
Office action from U.S. Appl. No. 11/630,683 dated Jan. 21, 2011.
Notice of Allowance from U.S. Appl. No. 11/630,683 dated Jun. 22, 2011.
Office action from U.S. Appl. No. 11/996,336 dated Feb. 16, 2011.
Office action from U.S. Appl. No. 11/996,336 dated Aug. 25, 2011.
Office action from Chinese Application No. 200580021634.4 dated Jul. 24, 2009.
Office action from Chinese Application No. 200580021634.4 dated Sep. 2, 2010.
Office action from Chinese Application No. 200880015649.3 dated Jul. 12, 2010.
Office action from Korean Application No. 10-2006-7027227 dated Mar. 6, 2012 with English explanation of relevant portions of action, 6 pgs.
Office action from Japanese Application No. 2008-522031 dated Mar. 27, 2012, 5 pgs.
Search Report from France Application No. 656723 dated May 20, 2005, 2 pgs.
Office action from Chinese Application No. 200580034102.4 dated Apr. 10, 2009, 9 pgs.
International Search Report and Written Opinion from PCT/FR05/050727 dated Jan. 26, 2006, 13 pgs.
Office action from Chinese Application No. 200580034102.4 dated May 11, 2010, 8 pgs.
International Search Report and Written Opinion from PCT/FR05/50497 dated Oct. 24, 2005, 7 pgs.
International Search Report and Written Opinion from PCT/FR06/50728 dated Jan. 12, 2007, 8 pgs.
International Search Report and Written Opinion from PCT/US08/063154 dated Oct. 20, 2008, 8 pgs.
Communication from Chinese Application No. 200580021634.4 dated Aug. 2, 2010, 1 pg.
Communication from European Application No. 06794482.7 dated Jul. 30, 2008, 4 pgs.
Communication from European Application No. 06794482.7 dated Sep. 30, 2010, 5 pgs.
Communication from European Application No. 05798963.4 dated Mar. 31, 2008, 4 pgs.
Office action from Korean Application No. 10-2007-7007843 dated May 30, 2012, 5 pgs.
Office action from Korean Application No. 10-2007-7007843 dated Dec. 31, 2012, 7 pgs.
Office action from Mexican Application No. MX/a/2008/001000 dated Oct. 25, 2011 with English explanation of relevant portions of action, 3 pgs.
Office action from Chiense Application No. 01812396.1 dated Jan. 27, 2006, 4 pgs.
Office action from Chinese Application No. 200580034201.4 dated Apr. 10, 2009, 9 pgs.
Office action from Chinese Application No. 200580034102.4 dated May 10, 2010, 8 pgs.
Search Report and Written Opinion from FR 0755025 dated Dec. 21, 2007, 11 pgs.
Office action from Indian Application No. IN/PCT/2002/01518 dated Nov. 18, 2005, 2 pgs.
Office action from Mexican Application No. 2008/001000 dated Oct. 25, 2011 along with English translation of relevant portions of action, 3 pgs.
Office action from Slovakia Application No. PP 1823-2002 dated Apr. 25, 2006, 4 pgs.
Office action from Korean Application No. 10-2008-7001574 dated Oct. 16, 2012, 5 pgs.
Interview Summary from U.S. Appl. No. 11/996,336 dated Sep. 17, 2013, 3 pgs.
Resubmission of Office action from U.S. Application No. 11/996,336 dated May 23, 2013, 54 pgs.
Notice of Allowance from U.S. Appl. No. 11/996,336 dated Oct. 11, 2013, 14 pgs.

* cited by examiner

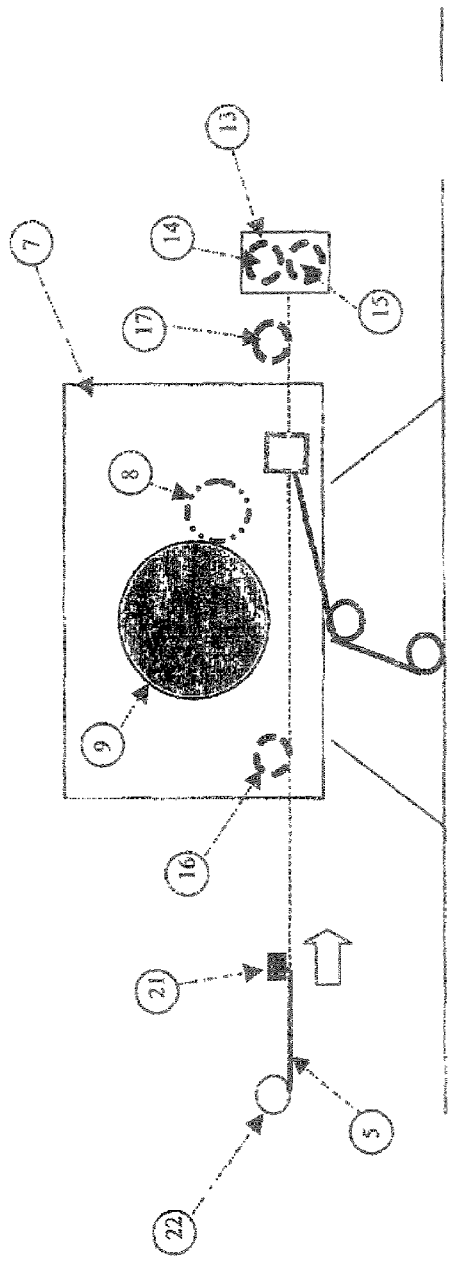
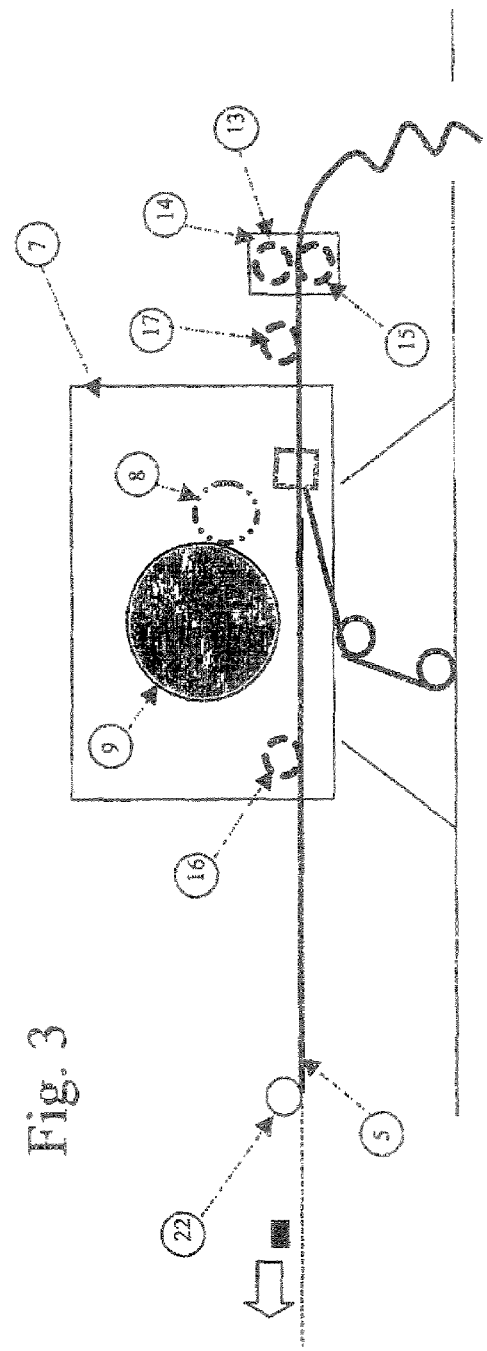

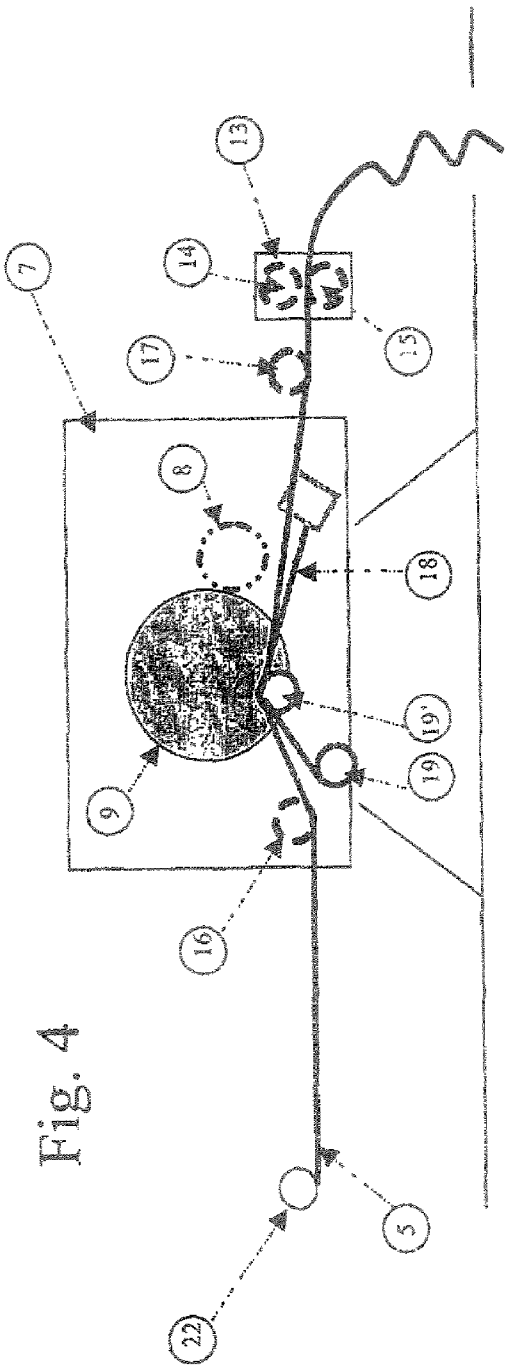
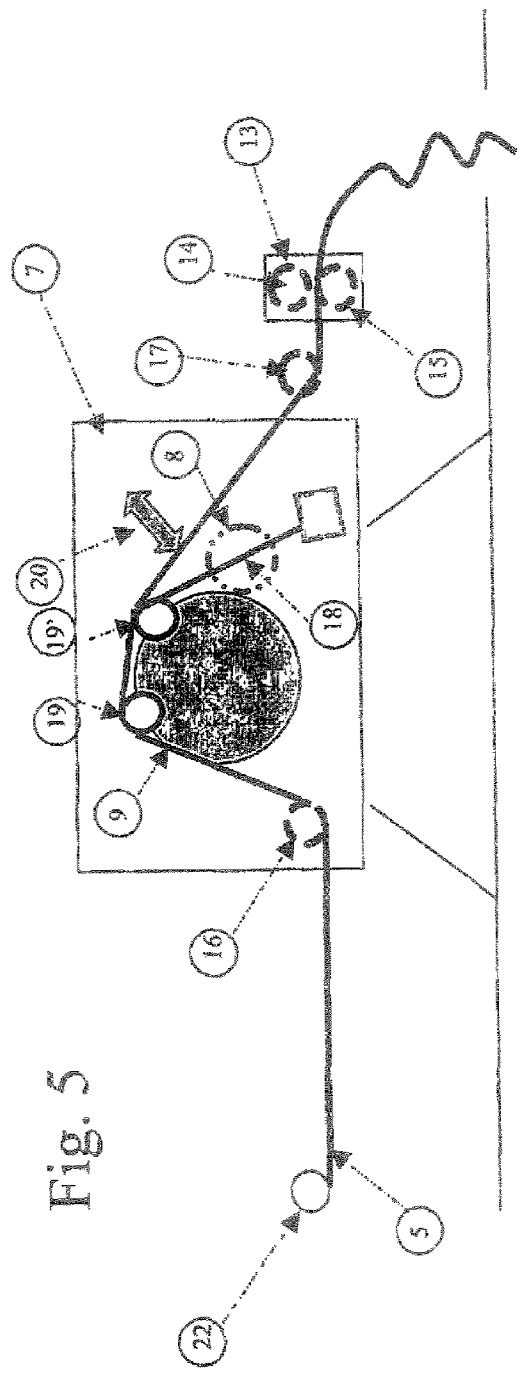
Fig. 4
Fig. 5

SYSTEM FOR MAKING CHOPPED STRANDS

CROSS-REFERENCE TO RELATED APPLICATIONS

The present application is the U.S. counterpart of WO 2006/037908 and claims priority to French Application No. 04/52285 filed on Oct. 7, 2004, the contents of each of which are hereby incorporated herein by reference.

The present invention relates to the field of the manufacture of chopped strands for technical use, particularly thermoplastic strands and especially glass strands and it relates more specifically an automatic restart procedure and to a system for manufacturing such strands that implements this procedure.

Many devices capable of carrying out such manufacture are known. In general, these systems comprise at least one bushing from which glass strands are drawn and taken into a chopping device, consisting for example of a backup roll or anvil that cooperates with a chopper roll fitted with blades uniformly distributed around its periphery. The chopper is placed so as to come into contact with pressure applied, with the circumferential surface of the backup roll, thus defining a chopping zone.

French Certificate of Addition FR 2 075 019 illustrates a system of this type in which a bushing is combined with a chopping device.

To increase the productivity of chopped-strand manufacturing installations, solutions have been devised in which several bushings feed a single chopping device. French Patent FR 2 490 251 illustrates a solution of this type. These techniques have in principle the advantage of employing a single chopping machine combined with several bushings.

Now, these, chopping machines are designed to produce the order of ten tons of chopped strands per day. It is conventionally accepted that, to produce such a quantity, the user is faced with several tens of "bushing breaks" (a "bushing break" is defined as a break in the web of filaments between the exit of the bushing and the chopper) that will require as many restart phases to be carried out by the operator (a restart phase is an operation consisting in re-establishing continuity of the web of filaments between the bushing and the chopper).

To significantly increase the production capacity (by at least a factor of two) constitutes an objective almost impossible to achieve when considering the same industrial equipment, with manual restart, served by the same number of users.

As mentioned above, the most critical stage is the interruption in the bushings as a result of a bushing break. These bushing breaks require human intervention to restart the strand in the chopping machine. This incident is therefore particularly detrimental to the production efficiency, as it requires a relatively long preparation time.

A restart operation, for feeding a strand into a chopper, is a transient operation that is very difficult to manage insofar as the strand is fragile and its linear speed has to be brought from almost zero to several tens of m/s. In general it is found that a restart operation is broken down into ⅔ of the time for re-establishing optimum operating conditions at the bushing, and a little less than ⅓ of the time for bringing the installation back on stream.

It will therefore be understood that this restart phase is a vital operation in this continuous process insofar as, if it is not 100% successful, the production is stopped and the efficiency of the machine falls.

A first restart technique consists in manually depositing a strand onto a set of feed rolls lying approximately tangentially to the anvil wheel as far as a restart wheel designed to progressively bring the speed of the strand to a speed compatible with the chopping speed, and then, at this speed, after the strand has been transferred from the feed rolls onto the anvil wheel, the strand is introduced by an articulated arm between the anvil wheel and the chopper wheel.

Although this restart operation has the advantage of preserving the thermal stability of the bushings in production during the restart, manual human intervention is required for depositing the strand and impressing thereonto a curvilinear path as far as the restart wheel. This makes the operation difficult to automate as such, owing to the kinematics of the movements.

A second technique, described for example in the document FR 2 804 974, which is an improvement over the first technique, consists in considering a linear path of the strand between the bushing and the restart wheel. For this purpose, a chopper is interposed in the linear path, whereby the equipment formed by the anvil wheel and the chopper wheel forms a kind of clamp which can, depending on the case, progressively grip the strand and make it undergo a rotational movement before finally arriving in a standard chopping position, or else to move it away therefrom.

Although it will be understood that such a device is easy to automate, it does have, however, a major drawback in that the device can chop only a single strand coming from a single bushing, and therefore a chopper of this type has to be dedicated to each bushing. From the economic standpoint, this arrangement is less advantageous.

Also known, from document U.S. Pat. No. 5,935,289, is a restart system that consists, via a gripping member traveling across a guiding tube, in reproducing the movement of the operator. The main drawback of this solution lies mainly in its size, since it is permanently facing the bushings, it poses safety problems and it runs the risk of impeding the operator's movement and his interventions in the process.

The present invention offers a solution to the abovementioned problems by providing a procedure for automating the restart on a chopper position downstream of a plurality of bushings.

According to the invention, the automatic restart procedure is, characterized in that:

- at least one strand coming from a bushing is grabbed by a gripping device;
- the gripping device is moved right to a drawing device, this drawing device being designed to bring said strand to a drawing speed compatible with a chopping operation carried out as said strand passes between an anvil wheel and a chopper wheel of a chopping machine; and
- the path of the strand between the bushing and the drawing device is modified using a transfer device, this transfer device being designed to pass the strand between the anvil wheel and the chopper wheel using an engagement device or, on the contrary, to be moved away from the anvil wheel and the chopper wheel.

In other preferred methods of implementing the invention, one or more of the following arrangements may optionally be also employed:

- the transfer device modifies the trajectory of the path of the strand between at least one entry guiding member and an exit guiding member positioned respectively upstream and downstream of the chopping machine in such a way that, in at least one portion of the path of the strand, the trajectory of the strand hugs a lea in part, the periphery of the anvil wheel and/or of the chopper wheel;
- the transfer device performs a first movement in which the initial path is deformed in a vertical restart plane perpendicular to the axis of rotation of the chopper wheel and/or the anvil wheel, and then a second movement of transfer from the restart plane P1 to a chopping plane P2 (shown in FIG. 7) in an approximately horizontal direction parallel to said rotation axis of the chopper and/or anvil wheels;

the gripping device is moved in a linear fashion between the entry guiding member and the exit guiding member respectively, said members being located between the upstream end and the downstream end of the chopping machine; and the strand is introduced at speed between the anvil wheel and the chopper using the engagement device.

Thus, the subject of the present invention is also a system intended for manufacturing chopped strands for technical use, in particular thermoplastic strands and especially glass strands, comprising at least one bushing that cooperates with at least one chopping machine comprising an anvil wheel and a chopper wheel, said chopping machine being placed in the extension of said bushing.

According to the invention, said system further includes a gripping device designed to move at least one strand up to a drawing device, for drawing said strand, and a transfer device for modifying the path of the strand between the bushing and the device for drawing said strand, the transfer device also being able to position the strand in at least two positions, namely one in which the strand is subjected to a pulling movement near the periphery of the anvil wheel and the chopper wheel and the other in which the strand is set back from the chopper wheel and the anvil wheel.

In other preferred embodiments of the invention, one or more of the following arrangements may optionally be also employed:

the system includes at least one entry guiding member for guiding the strand and at least one exit guiding member for guiding the strand, said entry guiding member and exit guiding member being positioned upstream and downstream of the chopping machine, respectively;

the entry strand guiding member is aligned substantially with a turn roller positioned beneath the bushing;

the entry strand guiding member and/or the exit strand guiding member are/is aligned with the strand drawing device;

the transfer comprises an articulated arm provided with at least one restart roll, this transfer device being articulated between a first position, called the rest position, in which the restart roll does not interfere with the path of the strand between the entry guiding member and the exit guiding member, and a second position, called the working position, in which the restart roll does interfere with the path of the strand between the entry guiding member and the exit guiding member and modifies its trajectory so as to make it hug the periphery of the chopper wheel and/or the anvil wheel;

the transfer device further includes an engagement device;

the engagement device comprises an arm articulated with respect to the chopper machine, this articulated arm occupying a first position in which it does not interfere with the path of the strand and a second position in which it does interfere with the path of the strand and in such a way that it forces the strand to pass between the anvil wheel and the chopper wheel; and the transfer device, in the rest position, is set back from the path of the strand.

Thanks to this automatic restart system, the productivity of such systems may be increased (less human intervention) and the production costs can be reduced while still meeting the latest expectations of customers.

More precisely, because of the automatic restart, it is more difficult for the kinematics of the gripping device to be subject to any drift over time, thereby reducing the risk of seeing the restart fail because of inappropriate human intervention.

Preferably, the various elements are arranged in such a way that the path of the strands and of the filaments from the bushing right to the chopping machine lies overall in a vertical plane, the filaments having an approximately vertical direction from the bushing right to the turn roller, and the strands having an approximately horizontal direction from the turn roller right to their entry into the chopping machine.

According to one embodiment of the invention, the system comprises several bushings associated with just one chopping machine, and said bushings are aligned one beside another.

Other features, details and advantages of the present invention will become more clearly apparent on reading the description that follows, given by way of illustration but implying no limitation, with reference to the appended drawings in which:

FIGS. 2 to 6 illustrate the various phases of the automatic restart procedure according to the invention.

Figure 1:
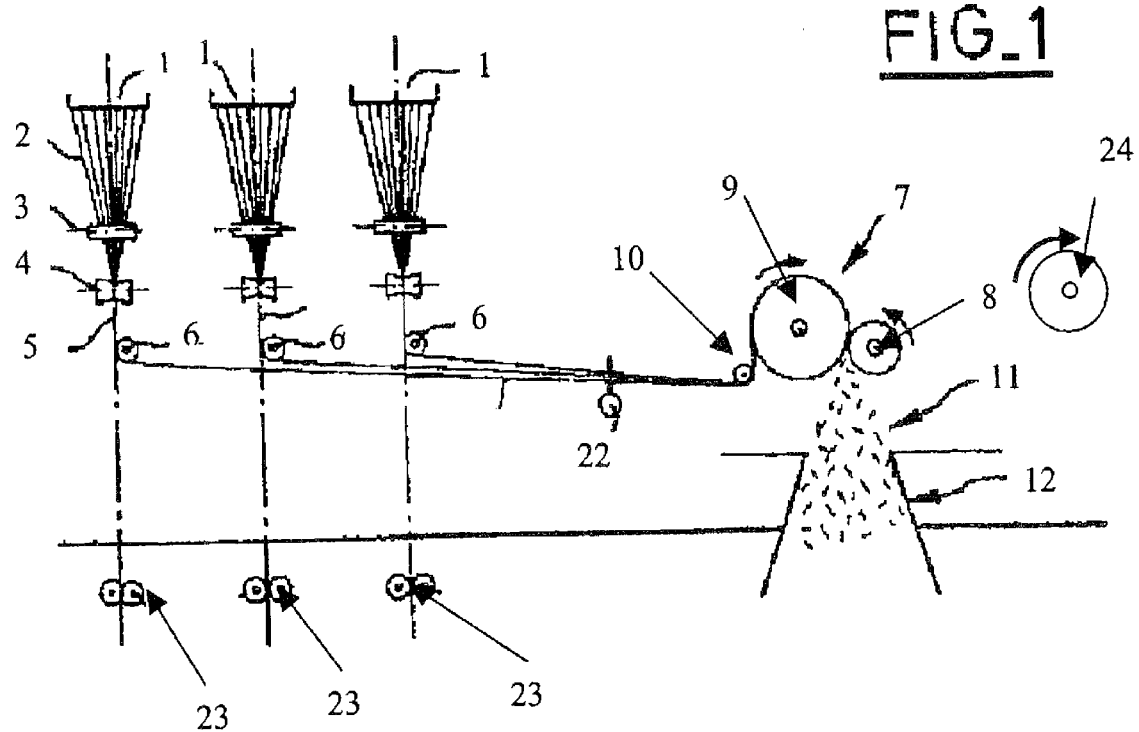
FIG. 1 is a schematic, overall and simplified view of an installation according to the prior art.

FIG. 1 therefore shows, schematically, the system according to the prior art, which comprises at least one bushing 1 fed, in a known manner, with molten glass or glass beads delivered by a feed device (not shown). These bushings, for example made of a platinum-rhodium alloy, are usually heated by resistance heating. They are provided, on their underside, with a plurality of orifices from which a plurality of filaments 2 (here some of them being shown by dot/dash lines) may be mechanically drawn.

The filaments 2 generally undergo a sizing operation, that is to say a chemical treatment designed to apply thereonto a product that provides the strand with cohesion and sufficient lubrication, and a capability to be subsequently used, in terms of processability and reinforcement/matrix compatibility, by a size applicator roller 3.

The filaments coming from a bushing are then combined by assembling rollers 4 into at least one strand 5 which is turned, by a device such as a deflection or turn roll 6, so as to send them to a chopping machine 7 located downstream of the bushing 1/size applicator roller 3/turn roll 6 assembly.

The chopping machine 7 may comprise a blade-carrying wheel 8, an anvil wheel 9 and, optionally, a grinding wheel (not shown), as described for example in patent application FR 2 075 019 filed in the name of the Applicant.

Moreover, the arrangement of the principal constituents of the installation illustrated in FIG. 1 is such that the path of the filaments 2 and then of the strands 5 lies generally in a vertical plane, from the bushing right to the chopping machine 7. More precisely, the filaments 2 lie firstly in an approximately vertical direction from the bushing to the turn roll 6, and then the strands 5 follow an approximately horizontal path to their entry into the chopping machine 7. A tensioning roll 10 may be provided at the entry of the machine so as to ensure that the strands are wrapped around the anvil-wheel over a sufficiently large arc to drive said strands by the friction force.

The bushing 1 and the size applicator roller 3 are placed one above the others for example within one and the same fiberizing cell which stands on the floor on which the chopping machine stands.

The turn roll 6 lies vertically above the size applicator roller 3. An opening made in the floor allows the bundle of filaments to pass downstream of the size applicator roller. This opening may also allow the fibers to be removed when there are bushing breaks.

Thus, the filaments 2 follow an approximately vertical path from the bushing 1 the turn roll 6, which turns the strands through 90° so as to bring them horizontally (or approximately horizontally) to the chopping machine 7. The chopping machine 7 firstly comprises a blade-carrying wheel 8 (or chopper wheel) and an anvil wheel 9. Details about the construction of these wheels are given in the prior literature, especially in publication EP 0 040 145. The anvil and chopper wheels are in contact with one another under slight pressure, in such a way that, in the contact zone, which is also the chopping zone, deformation of the elastomer results in the blades of the blade-carrying wheel being flush. In practice, only one of the two wheels is a driving wheel, the other being driven by being in contact therewith. Preferably, it is the blade-carrying wheel that is the driving wheel. The driving is performed by an electric motor, preferably with direct transmission via the hub of the wheel in question.

The chopped strands 11 are collected in a receiving device 12. During the gaps in the chopping operation, in particular when a bushing is being restarted, the strands are drawn by a drawing system 23 usually called a strand puller (cf. see FIG. 1). The strands have to be drawn, before the chopping operation begins or when a bushing is being restarted, in order to establish steady-state operation of the bushing and therefore to guarantee well-defined strand quality.

Under running conditions the chopping machine 7 pulls on the strands, either or both of the anvil 9 and the blade-carrying wheel 8 of the machine being motor-driven.

The strand must pass from vertically below the bushing 1 to the chopping machine 7, either when starting up the assembly or during a restart phase, in one manner or the other, so that the strand is driven into the contact zone between the chopper wheel and the anvil wheel.

It will be recalled that, conventionally and according to the prior art, this introduction is carried out manually by the operator. This restart phase consists, in a known manners in grabbing a strand from the strand puller positioned at the base of the bushing and in bringing it to a restart wheel (shown schematically by the reference 24 in FIG. 1) that is usually located on the chopping machine, the function of this restart wheel being to increase the speed of the strand, which is wrapped around the peripheral surface of the wheel, from zero or almost zero to a drawing speed similar to that which will be imposed by the chopping device.

The present invention aims to improve this installation of the prior art by substituting the chopping machine referenced 7 in FIG. 1 with that shown in FIGS. 2 to 6, the latter installation being provided with an automatic restart system. In order to better understand the chopping machine and its automatic restart system, these are installed downstream of the turn roll 6.

Without departing from the scope of the invention, the chopping machine with its automatic restart system may be placed to the rear or to the front of the bushing or to the right or the left and under the bushing.

In the diagram shown in FIG. 1, three bushings are shown. According to the invention, the number of bushings is increased (to more than 6). However, this number is not arbitrary. Although it is advantageous to be able to treat a plurality of strands simultaneously, increasing their number also increases the risk of possible disruption of the assembly and it is therefore recommended to achieve a compromise between the increase in productivity obtained by increasing the number of strands and the loss of productivity due to the frequency of operating interruptions, which also depends on the number of strands. This once again stresses the importance of being able to restart a strand automatically, without interrupting the production.

This is accomplished by using a high-speed drawing device 13 (visible in particular in FIG. 2) designed to draw at least one strand 5 coming from at least one web of filaments 2, each of the webs coming from at least one bushing 1, or from a portion of at least one bushing belonging to a fiber zing cubicle juxtaposed therebetween. This high-speed drawing device 13, in the low-bushing direct chopping process, is inserted into the path of the strands 5 downstream of the chopping machine 7. Without being limiting, the latter may be what is called a "twin-head" chopper or a rotary chopper.

The high-speed drawing device comprises a three-dimensional frame possessing three or more sides, this being assembled from standard commercial components by conventional welding fabrication or equivalent techniques.

As may be seen in FIG. 2, the driving members 14, 15 have been shown schematically by two circles of dots. Each of these members 14, 15 projects laterally on one of the sides and undergoes a respective rotational movement, in opposite directions one with respect to the other. This rotational movement is generated by a kinematic chain, comprising at least one motor positioned inside the frame. The motor, the speed of which may be adapted so as to obtain speeds ranging from a few meters per second (for example 0 to 5 m/s) to a few tens of meters per second (30 to 50 m/s) by any appropriate device, such as for example a variable-frequency asynchronous motor, or a DC motor with a speed regulator, is engaged, for example via a system of gears or of belt-driven pulleys, with a shaft on which each of the wheels is mounted. The drawing speed reached is approximately the order of magnitude of the chopping speed reached by the chopping machine 7.

In an alternative embodiments the drive members 14, 15 form a chopper. One of the members constitutes the anvil, while the other forms a chopping counterwheel provided with a plurality of blades mounted approximately perpendicular to the path of said strand. This alternative embodiment may be particularly advantageous as it is possible to continue to produce chopped strands during the transient phases, during which restart steps on the main chopping machine are carried out.

In FIG. 2, a gripping device 21, for example made in the form of a ram one of the ends of which is provided with a gripper or clamp, grasps onto the web of strands 5 that it is desired to automatically restart and takes it to the drawing device 13 the gripping device having extracted the strand 5 from the strand puller 23 during its travel.

The gripping device 21 provided with its gripper or any other similar device performs a linear motion from the turn roll 6 to the high-speed drawing device 13.

The automatic restart procedure is broken down in the following manner (see the sequence in FIGS. 2 to 6).

In FIG. 3, the strand 5 is drawn by the high-speed drawing device 13 through drive members 14, 15. The path of the strand is approximately linear between the turn roll 6 and the high-speed drawing device 13 and lies substantially in a vertical plane, which is perpendicular to the rotation axis of the wheels 9 and 8 of the chopping machine 7.

It should be pointed out that the strand 5, over its path between the turn roll 10 and the high-speed drawing device 13, is guided by at least one entry strand guiding member 16 and at least one exit strand guiding member 17 positioned upstream and downstream of the chopping machine 7, respectively. These members are approximately in line and lie in the same plane as the turn wheel 10 and the high-speed drawing device 13.

FIG. 4 shows schematically a transfer device 18. This transfer device, thanks to a movement relative to the chopping machine—in the nonlimiting example shown in FIG. 4 this is a rotational movement—modifies the trajectory of the strand path between the entry guiding member 16 and the exit guiding member 17 during the high-speed strand drawing phase (This relative movement could consist of a translational movement or a combination of rotational and translational movements).

This transfer device 18 is provided with at least one restart roll 19, 19', this transfer device 18 being articulated between a first position, called the rest position (FIG. 4 or FIG. 6), in which the restart roll does not interfere with the path of the strand between the entry guiding member 16 and the exit guiding member 17, and a second position, called the working position (FIG. 5), in which the restart roll does interfere with the path of the strand between the entry guiding member 16 and the exit guiding member 17 and modifies its trajectory so as to make it hug the periphery of the anvil wheel 9 and/or the chopper wheel 8.

Figure 6:
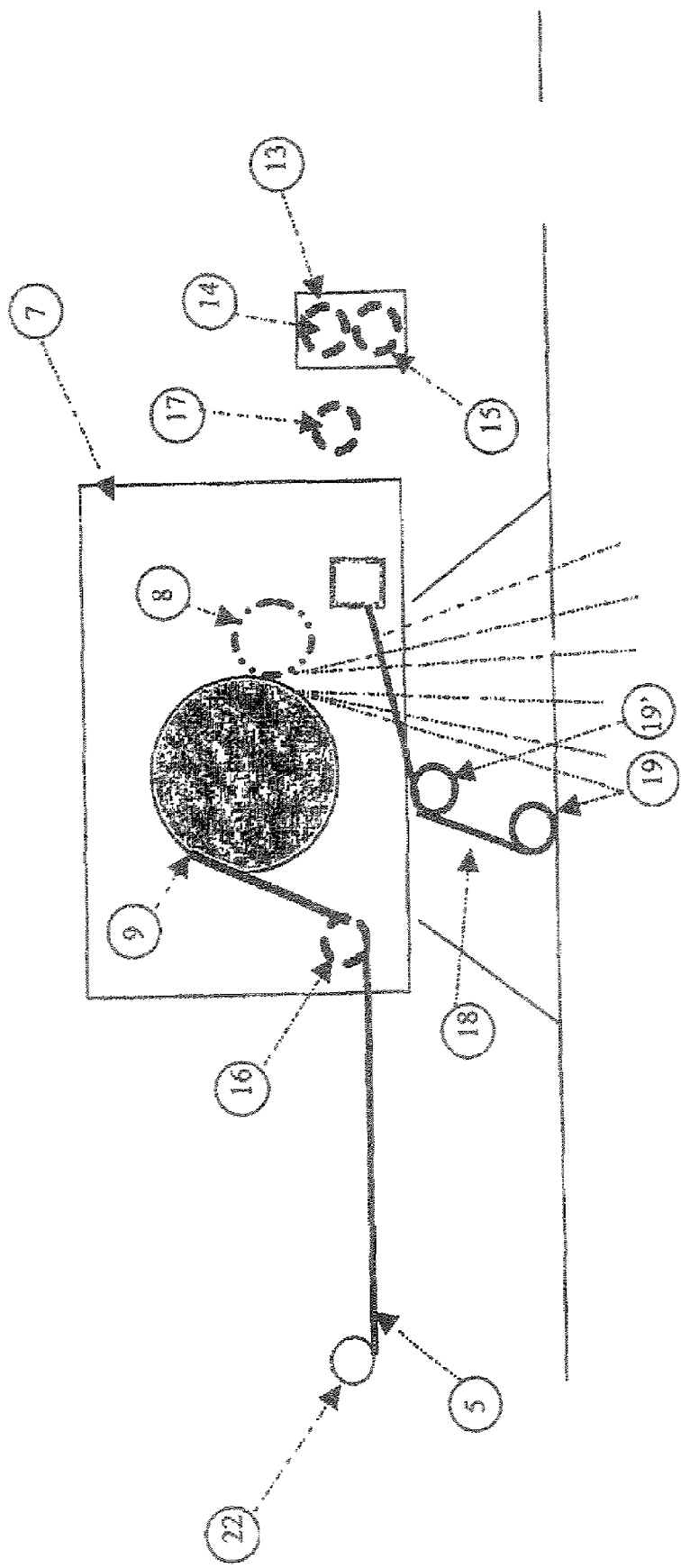
Figure 7:
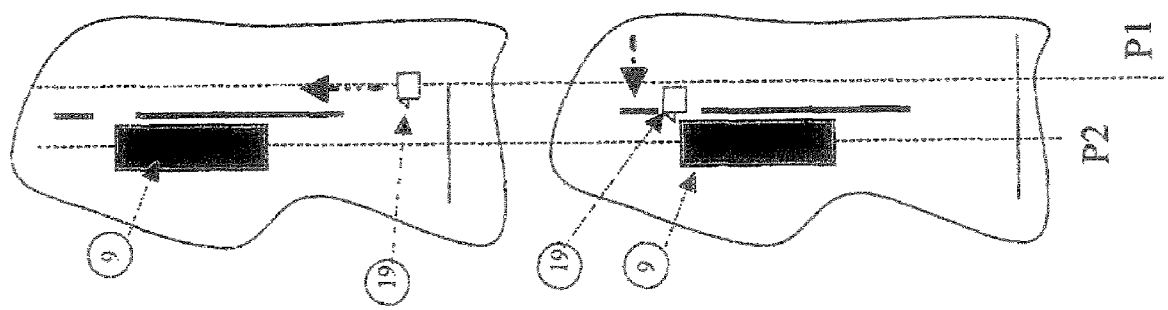
FIG. 7 is a top view of the installation, illustrating the chopping plane and the restart plane.

During the operating phase shown in FIG. 5, the path of the strand is broken down into two steps between its rest position and its working position. This is because, during this transfer movement, it is necessary for the strand to perform a movement in a vertical plane, which constitutes the restart plane P1 (seen in FIG. 7) which brings it so as to be approximately facing the periphery of the chopper and anvil wheels, and then a second movement approximately in a horizontal plane, approximately perpendicular to the previous one, which constitutes the chopping plane P2 (seen in FIG. 7) during which the strand remains on the periphery of the chopper and anvil wheels and can travel over the top of them so that an engagement device 20 (shown symbolically by a double arrow in FIG. 5) can, as its name indicates, engage the strand between the chopper wheel and the anvil wheel, as shown in FIG. 6.

In the example shown in FIG. 5, the engagement device may be produced by an arm articulated with respect to the chopping machine, this articulated arm occupying a first position in which it does not interfere with the path of the strand and a second position in which it does interfere with the path of the strand and in such a way that it lies in a plane passing between the anvil wheel and the chopper wheel. It should be pointed out that, in the rest position (see FIG. 6), the transfer device 18 and its restart rolls 19, 19' is set back with respect to the path of the strand and lies at a level below the base of the chopping machine, which can rotate on itself.

The sequence shown in FIGS. 2 to 6 illustrates the automatic restart of a strand from vertically below a bushing to the chopping machine, but it will be readily understood that this sequence may be performed for whatever strand coming from at least one bushing or bushing portion, it being understood that, during the phase of restarting one of the strands, the others remain in production, that is to say they are chopped by the chopping machine.

The transfer, engagement, gripping and drawing device of the automatic restart system described above are all operated and controlled by a controller or any other equivalent computer system.

Advantageously the present invention meets the increasingly stringent safety requirements. Using the automatic restart, the time during which there is contact between the operator and the fiber is reduced, thereby lowering the risk of an incident (cut, burn, etc.).

According to the present invention, the operator watches the automatic restart phases for each of the bushings—his own movements are thus considerably reduced between the bushings and the chopper—and he can thus bring his entire attention to the transient phase of re-establishing the thermal stability of the bushing.

The invention claimed is:

1. A system configured to manufacture chopped strands and perform an automatic restart procedure, the system comprising:
   at least one bushing,
   at least one chopping machine comprising an anvil wheel and a chopper wheel, said at least one chopping machine being placed in an extension of said at least one bushing,
   a drawing device comprising a plurality of drive members,
   a gripping device configured to move at least one strand exiting the at least one bushing to the drawing device, and
   a transfer arm for modifying the trajectory of said at least one strand to form at least a first strand path and a second strand path between said at least one bushing and said drawing device,
   wherein in said first strand path, said at least one strand contacts at least a portion of a periphery of at least one of said anvil wheel and said chopper wheel, and
   wherein in said second strand path, said at least one strand is positioned a distance from said chopper wheel and said anvil wheel.

2. The system as claimed in claim 1, further comprising at least one entry guiding member for guiding said at least one strand and at least one exit guiding member for guiding said at least one strand, said entry guiding member and said exit guiding member being positioned upstream and downstream of said chopping machine, respectively.

3. The system as claimed in claim 2, wherein said entry guiding member is aligned substantially with a turn roller positioned beneath said at least one bushing.

4. The system as claimed in claim 2, wherein at least one of said entry guiding member and said exit guiding member is aligned with said drawing device.

5. The system as claimed in claim 1, further comprising at least one restart roll, wherein said transfer arm is configured to be moved between a rest position, in which said at least one restart roll does not interfere with said path of said at least one strand between said entry guiding member and said exit guiding member, and a working position, in which said at least one restart roll does interfere with said path of said at least one strand between said entry guiding member and said exit guiding member and modifies the trajectory of said at least one strand so as to make said at least one strand hug said periphery of at least one of said chopper wheel and said anvil wheel.

6. The system as claimed in claim 5, wherein said transfer arm, in the rest position, is positioned a distance from said path of said at least one strand.

7. The system as claimed in claim 5, wherein said transfer arm comprises an articulated arm.

8. The system as claimed in claim 1, further comprising an engagement arm for engaging said at least one strand between said chopper wheel and said anvil wheel.

9. The system as claimed in claim 8, wherein said engagement arm is configured to be moved with respect to the chopping machine between a first position, in which said arm does not interfere with said path of said at least one strand, and a second position in which said arm does interfere with said path of said at least one strand and forces said at least one strand to pass between said anvil wheel and said chopper wheel.

10. The system as claimed in claim 9, wherein said engagement arm comprises an articulated arm.

11. The system as claimed in claim 1, wherein said drawing device comprises a frame, wherein the drive members are mounted to the frame, and wherein the drive members are configured to rotate.

12. The system as claimed in claim 11, wherein the drive members forms said chopping machine.

13. The system as claimed in claim 11, further comprising a motor for rotating said drive members.

14. The system as claimed in claim 1, wherein said gripping device comprises at least one clamp.

15. A system configured to manufacture chopped strands and perform an automatic restart procedure, the system comprising:
    at least one bushing,
    at least one chopping machine comprising an anvil wheel and a chopper wheel, said at least one chopping machine being placed in an extension of the at least one bushing;
    a drawing device comprising a frame and a plurality of drive members mounted to the frame, wherein the drive members are configured to rotate for drawing at least one strand from the at least one bushing;
    a gripping device comprising at least one clamping member, wherein the gripping device is configured to move the at least one strand exiting the at least one bushing to the drawing device; and
    a transfer arm for modifying the trajectory of said at least one strand to form at least a first strand path and a second strand path between said at least one bushing and said drawing device,
    wherein in said first strand path, said at least one strand contacts at least a portion of a periphery of at least one of said anvil wheel and said chopper wheel, and
    wherein in said second strand path, said at least one strand is positioned a distance from said chopper wheel and said anvil wheel.

16. The system as claimed in claim 15, further comprising at least one entry guiding member and at least one exit guiding member for guiding said at least one strand, said entry guiding member and said exit guiding member being positioned upstream and downstream of said chopping machine, respectively.

17. The system as claimed in claim 15, further comprising at least one restart roll, wherein said transfer arm comprises an articulated arm, wherein said transfer arm configured for movement between a rest position, in which said at least one restart roll does not interfere with said path of said at least one strand between said entry guiding member and said exit guiding member, and a working position, in which said at least one restart roll does interfere with said path of said at least one strand between said entry guiding member and said exit guiding member and modifies a the trajectory of said at least one strand so as to make said at least one strand hug said periphery of at least one of said chopper wheel and said anvil wheel.

18. The system as claimed in claim 17, wherein said transfer arm, in the rest position, is positioned a distance from said path of said at least one strand.

19. The system as claimed in claim 15, further comprising an engagement arm for engaging said at least one strand between said chopper wheel and said anvil wheel.

20. The system as claimed in claim 19, wherein said engagement arm comprised an articulated arm configured for movement with respect to the chopper machine between a first position, in which said arm does not interfere with said path of said at least one strand, and a second position in which said arm does interfere with said path of said at least one strand and forces said at least one strand to pass between said anvil wheel and said chopper wheel.

* * * * *